United States Patent
Mishra et al.

(10) Patent No.: US 10,872,055 B2
(45) Date of Patent: Dec. 22, 2020

(54) TRIPLE-DATA-RATE TECHNIQUE FOR A SYNCHRONOUS LINK

(71) Applicant: QUALCOMM Incorporated, San Diego, CA (US)

(72) Inventors: Lalan Jee Mishra, San Diego, CA (US); Richard Dominic Wietfeldt, San Diego, CA (US); Helena Deirdre O'Shea, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 15/226,113

(22) Filed: Aug. 2, 2016

(65) Prior Publication Data

US 2018/0039598 A1 Feb. 8, 2018

(51) Int. Cl.
| | |
|---|---|
| G06F 13/42 | (2006.01) |
| H04L 7/04 | (2006.01) |
| H04L 25/49 | (2006.01) |
| H04L 7/00 | (2006.01) |
| G06F 13/364 | (2006.01) |
| H04L 7/033 | (2006.01) |

(52) U.S. Cl.
CPC ........ G06F 13/4291 (2013.01); G06F 13/364 (2013.01); H04L 7/0008 (2013.01); H04L 7/044 (2013.01); H04L 25/4902 (2013.01); H04L 7/033 (2013.01)

(58) Field of Classification Search
None
See application file for complete search history.

(56) References Cited

U.S. PATENT DOCUMENTS

| | | | | |
|---|---|---|---|---|
| 5,923,705 | A | * | 7/1999 | Willkie ............... H04L 25/0262 375/219 |
| 7,668,524 | B2 | | 2/2010 | Law et al. |
| 8,359,445 | B2 | | 1/2013 | Ware et al. |
| 8,391,433 | B2 | | 3/2013 | Warren |
| 8,680,894 | B1 | * | 3/2014 | Inbar ..................... G09G 3/346 327/108 |

(Continued)

FOREIGN PATENT DOCUMENTS

EP    1298667 A2    4/2003

OTHER PUBLICATIONS

International Search Report and Written Opinion—PCT/US2017/044990—ISA/EPO—dated Oct. 5, 2017.

Primary Examiner — Henry Tsai
Assistant Examiner — Christopher A Bartels
(74) Attorney, Agent, or Firm — Loza & Loza LLP

(57) ABSTRACT

Systems, methods, and apparatus for transmitting additional information over a synchronous serial bus are described. A method performed at a transmitting device coupled to the serial bus includes providing first data in a data signal to be transmitted on a first wire of a multi-wire serial bus, providing a series of pulses in a clock signal to be transmitted on a second wire of a multi-wire serial bus, where each pulse has a rising edge and a falling edge, each edge being aligned with a different bit of the first data. The method may include encoding second data in the clock signal by controlling a duration of each pulse in the series of pulses based on a value of one or more bits of the second data, and transmitting the data signal and the clock signal over the serial bus.

30 Claims, 14 Drawing Sheets

(56) References Cited

U.S. PATENT DOCUMENTS

| | | |
|---|---|---|
| 8,948,209 B2 | 2/2015 | Tailliet et al. |
| 9,152,598 B2 | 10/2015 | Fosse et al. |
| 9,432,298 B1 | 8/2016 | Smith |
| 9,727,506 B2* | 8/2017 | Takahashi ............ G06F 13/364 |
| 10,432,258 B1* | 10/2019 | Mitchell ................ H04L 67/12 |
| 2001/0016789 A1 | 8/2001 | Staiger |
| 2006/0250884 A1 | 11/2006 | Shimbayashi |
| 2006/0271314 A1* | 11/2006 | Hayes ................ G01R 22/063 <br> 702/62 |
| 2011/0164460 A1 | 7/2011 | Kajigaya et al. |
| 2012/0159072 A1 | 6/2012 | Hida et al. |
| 2012/0233380 A1 | 9/2012 | Butterfield |
| 2014/0003451 A1* | 1/2014 | Wagh ................ H04L 41/0896 <br> 370/468 |
| 2014/0006670 A1* | 1/2014 | Wagh ................ G06F 13/4027 <br> 710/305 |
| 2014/0359178 A1* | 12/2014 | Aue .................... G06F 13/4234 <br> 710/106 |
| 2014/0359179 A1* | 12/2014 | Aue ...................... G06F 13/42 <br> 710/106 |
| 2014/0359180 A1* | 12/2014 | Aue ................... G06F 13/4004 <br> 710/107 |
| 2015/0193297 A1 | 7/2015 | Ngo et al. |
| 2015/0220472 A1 | 8/2015 | Sengoku |
| 2015/0286606 A1 | 10/2015 | Sengoku |
| 2016/0098060 A1* | 4/2016 | Seo ...................... G06F 3/0653 <br> 713/501 |
| 2016/0224489 A1* | 8/2016 | Mishra ................. G06F 13/364 |
| 2017/0097912 A1* | 4/2017 | Takahashi ............ G06F 13/364 |
| 2017/0104655 A1* | 4/2017 | Takahashi ............ H04L 1/0063 |
| 2017/0255588 A1* | 9/2017 | Pitigoi-Aron ........ G06F 13/364 |
| 2017/0332089 A1* | 11/2017 | Hicks ................... H04N 19/31 |
| 2017/0356961 A1* | 12/2017 | Eder .............. G01B 31/318597 |
| 2018/0102779 A1* | 4/2018 | Behel .................... H03L 7/0814 |
| 2018/0196465 A1* | 7/2018 | Sharpe-Geisler ......... G06F 1/14 |
| 2019/0171609 A1* | 6/2019 | Mishra .............. H04L 12/40078 |

\* cited by examiner

TRIPLE-DATA-RATE TECHNIQUE FOR A SYNCHRONOUS LINK

TECHNICAL FIELD

The present disclosure relates generally to an interface between processors and a peripheral devices and, more particularly, to improving data throughput of a synchronous serial data link.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may operate synchronously. In one example, the serial bus may include two wires that carry a clock signal and a data signal, where the clock signal controls the timing of data bits transmitted in the data signal. The serial bus may be operated according to a communication protocol that defines a master-slave relationship between devices coupled to the serial bus where, for example, a master device provides the clock signal and controls transmissions on the serial bus. Multiple master devices may be coupled to the serial bus and may contend for control of the serial bus. A serial bus in such systems and apparatus may employ a combination of protocols (such as the I3C protocol, which is derived from the Inter-Integrated Circuit (I2C) protocol).

In some systems and apparatus, mobile communications devices such as cellular phones may employ multiple devices, such as cameras, displays and various communications interfaces that are sensitive to communication latency, where there is a continuous demand for reduced latencies. Latency, in turn, is a key driver to demands for increased data throughput over 2-wire synchronous links. Accordingly, there is an ongoing need to increase available bandwidth on a serial bus.

SUMMARY

Certain aspects of the disclosure relate to systems, apparatus, methods and techniques that enable the communication of additional data by modulating a clock signal transmitted on a synchronous data communication link.

In various aspects of the disclosure, a method performed at a receiving device coupled to the serial bus includes generating a plurality of sampling edges from a plurality of pulses in a clock signal received from a first wire of a multi-wire serial bus, where a duration of each pulse in the plurality of pulses is representative of a value of one or more bits of the additional data. The method may include using each edge in the plurality of sampling edges to capture a data bit from a data signal received from a second wire of the multi-wire serial bus, and decoding additional data from the clock signal.

In one example, the duration of each pulse in the plurality of pulses is representative of a value of one bit of the additional data. In another example, the duration of each pulse in the plurality of pulses is representative of a value of two bits of the second data.

In one aspect, the method includes generating a receive clock synchronized with the clock signal and the data signal, and capturing data bits from the data signal using the receive clock. Capturing the data bits from the data signal may include capturing one data bit per cycle of the receive clock. Capturing the data bits from the data signal may include capturing two data bits per cycle of the receive clock. Start bits may be received from the data signal before data bits are captured from the data signal, and the receive clock may be synchronized using one or more pulses received in the clock signal while receiving the start bits. Each of the one or more pulses may has a duration that is approximately half the period of the clock signal. The clock signal may have an approximate 50% duty cycle while the start bits are being received.

In one aspect, the center of each pulse in the clock signal may be aligned with a transition between successive bits in the data signal.

In one example, the additional data is decoded from the clock signal while the serial bus is operated in accordance with an I3C protocol. In another example, the additional data is decoded from a clock signal transmitted in accordance with a protocol associated with a Virtual Graphics Interface (VGI) or an interface based on universal asynchronous receiver/transmitter (UART) technology.

In various aspects of the disclosure, a method performed at a transmitting device coupled to the serial bus includes providing first data in a data signal to be transmitted on a first wire of a multi-wire serial bus, providing a series of pulses in a clock signal to be transmitted on a second wire of a multi-wire serial bus, where each pulse has a rising edge and a falling edge, each edge being aligned with a different bit of the first data. The method may include encoding second data in the clock signal by controlling a duration of each pulse in the series of pulses based on a value of one or more bits of the second data, and transmitting the data signal and the clock signal over the serial bus.

In one example, one bit of the second data is used to select between two possible pulse durations for each pulse. In another example, two bits of the second data are used to select between four possible pulse durations for each pulse.

In one aspect, the method includes providing start bits in the data signal, where the start bits precede the first data in transmission, and clocking the start bits using two pulses in the clock signal. Each of the two pulses have a duration that is approximately half the period of the clock signal. The clock signal may have an approximate 50% duty cycle while the start bits are transmitted.

In one aspect, the center of each pulse in the clock signal is aligned with a transition between successive bits in the data signal.

In one aspect, the controlling the duration of each pulse includes selecting the duration of each pulse from a plurality of possible durations based on the value of the one or more bits of the second data, where for each of the plurality of possible durations, the timing of edges of each pulse remain within tolerances defined for clock jitter on the serial bus.

In one aspect, the data is transmitted while the serial bus is operated in accordance with an I3C protocol. In another example, the additional data is transmitted in a clock signal transmitted in accordance with a protocol associated with a VGI or an interface based on universal asynchronous receiver/transmitter (UART) technology.

DETAILED DESCRIPTION

Figure 1:
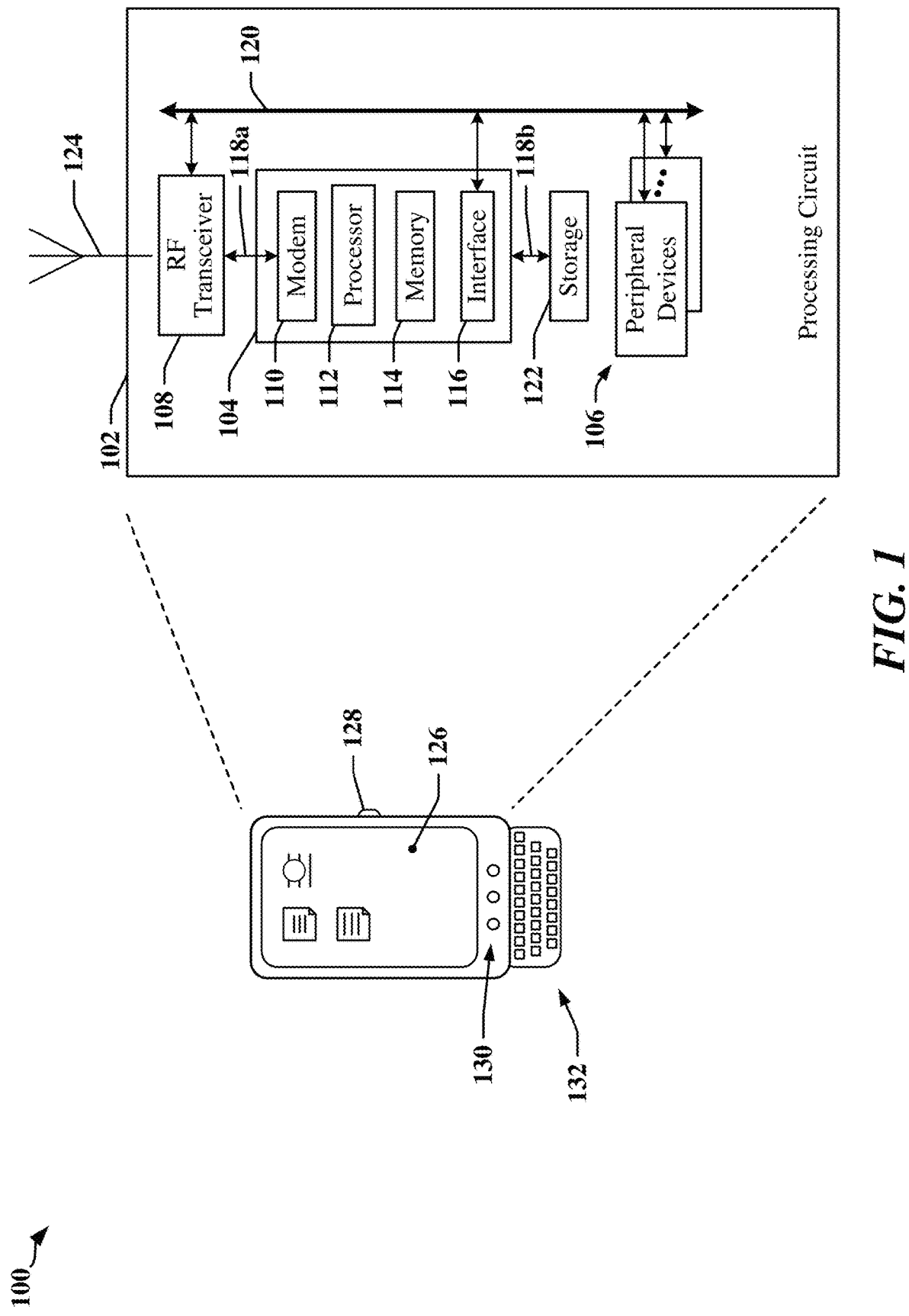
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Serial interfaces are frequently used for digital communication between components, functions and circuits provided in one or more devices, where the devices may include SoCs and/or IC devices. A serial data link deployed between processors, modems and other peripherals may be operated in accordance with specifications and protocols defined by a standards body. In one example, the serial data link may be operated in accordance I3C protocols, which includes a synchronous mode of operation in which data is transmitted on a first wire of a two-wire bus in accordance with a clock signal transmitted on the second wire of the two-wire bus.

Increasing capabilities of the IC devices and increased frequencies of operation results in continual demands for increased performance of serial data links. Data link throughput enhancement has been a primary motivator for reducing data link latency. In a conventional single data rate (SDR) link, one bit of data is transmitted in each clock period. In a 2-wire synchronous double data rate (DDR) link, data rate is doubled with respect to the clock by transmitting data bits on rising and falling edges of the clock. The clock itself carries no information. Certain aspects disclosed herein provide systems and methods in which the effective rate of a serial data link can reach or exceed three times the rates achieved on a SDR link.

Example of an Apparatus with a Serial Data Link

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC device 104, one or more peripheral devices 106, and a transceiver 108 that enables the apparatus to communicate through an antenna 124 with a radio access network, a core access network, the Internet and/or another network.

The ASIC device 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC device 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC device 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
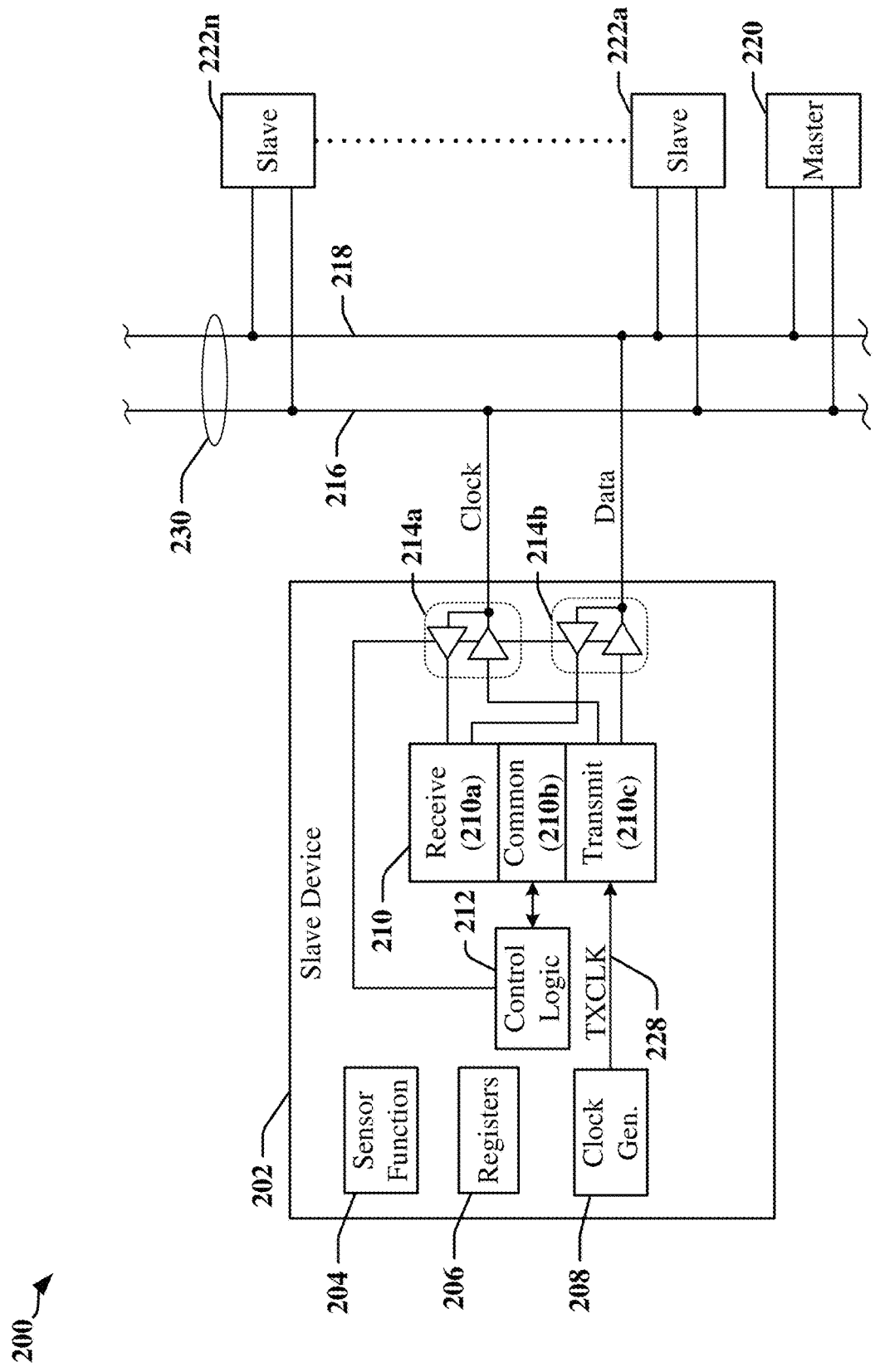
FIG. 2 illustrates a system architecture for an apparatus employing a data link between IC devices.

FIG. 2 illustrates certain aspects of an apparatus 200 that includes multiple devices 202, 220 and 222a-222n connected to a serial bus 230. A first wire 216 of the serial bus 230 carries a clock signal and a second wire 218 of the serial bus 230 carries data transmitted in accordance with timing provided by the clock signal transmitted on the first wire 216. The devices 202, 220 and 222a-222n may include one or more semiconductor IC devices, such as an applications processor, SoC or ASIC. Each of the devices 202, 220 and 222a-222n may include, support or operate as a modem, a signal processing device, a display driver, a camera, a user interface, a sensor, a sensor controller, a media player, a transceiver, and/or other such components or devices. Communications between devices 202, 220 and 222a-222n over the serial bus 230 is controlled by a bus master 220. Certain types of bus can support multiple bus masters 220.

The apparatus 200 may include multiple devices 202, 220 and 222a-222n that communicate when the serial bus 230 is operated in accordance with I2C, I3C or other protocols. At least one device 202, 222a-222n may be configured to operate as a slave device on the serial bus 230. In one example, a slave device 202 may be adapted to provide a sensor control function 204. The sensor control function 204 may include circuits and modules that support an image sensor, and/or circuits and modules that control and communicate with one or more sensors that measure environmental conditions. The slave device 202 may include configuration registers or other storage 206, control logic 212, a transceiver 210 and line drivers/receivers 214a and 214b. The control logic 212 may include a processing circuit such as a state machine, sequencer, signal processor or general-purpose processor. The transceiver 210 may include a receiver 210a, a transmitter 210c and common circuits 210b, including timing, logic and storage circuits and/or devices. In one example, the transmitter 210c encodes and transmits data based on timing provided by a clock generation circuit 208.

Two or more of the devices 202, 220 and/or 222a-222n may be adapted according to certain aspects and features disclosed herein to support a plurality of different communication protocols over a common bus, which may include the I2C protocol, and/or the I3C protocol. In some instances, devices that communicate using the I2C protocol can coexist on the same 2-wire interface with devices that communicate using I3C protocols. In one example, the I3C protocols may support a mode of operation that provides a data rate between 6 megabits per second (Mbps) and 16 Mbps with one or more optional high-data-rate (HDR) modes of operation that provide higher performance. The I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 230, in addition to data formats and aspects of bus control. In some aspects, the I2C and I3C protocols may define direct current (DC) characteristics affecting certain signal levels associated with the serial bus 230, and/or alternating current (AC) characteristics affecting certain timing aspects of signals transmitted on the serial bus 230.

Timing in One Example of a Serial Bus

Figure 3:
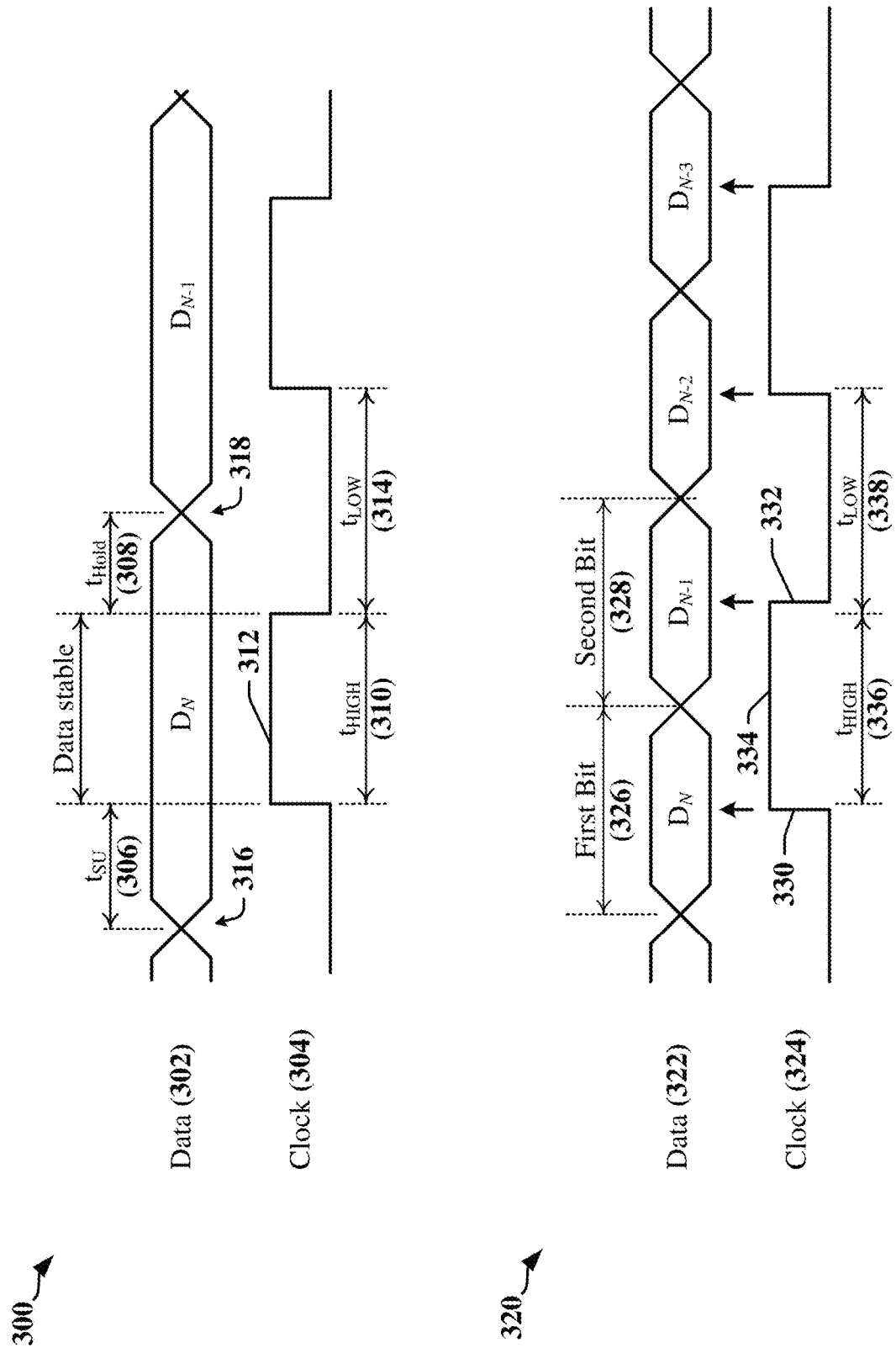
FIG. 3 illustrates certain aspects of the timing relationship between data and clock signals on a serial bus.

FIG. 3 includes timing diagrams 300 and 320 that illustrate an example of the relationship between the data signal 302 and the clock signal 304 on a synchronous serial bus. The first timing diagram 300 illustrates the timing relationship between the data signal 302 and the clock signal 304 when data is being transferred while the serial bus is operated in an SDR mode. The clock signal 304 provides a series of pulses that can be used to sample data in the data signal 302. The pulses (including the pulse 312, for example) may be defined as the time during which the clock signal 304 is determined to be in a high logic state at a receiver. When the clock signal 304 is in the high logic state during data transmission, data on the data signal 302 is required to be stable and valid; the state of the data signal 302 is not permitted to change when the clock signal 304 is in the high logic state.

In one example, I3C protocols for SDR modes of communication define a minimum duration 310 ($t_{HIGH}$) of the high period of the pulse 312 on the clock signal 304. The I3C protocols may also define minimum durations for a setup time 306 ($t_{SU}$) before occurrence of the pulse 312, and a hold time 308 ($t_{Hold}$) after the pulse 312 terminates. The signaling state of the data signal 302 is expected to be stable during the setup time 306 and the hold time 308. The setup time 306 defines a maximum time period after a transition 316 between signaling states on the data signal 302 until the arrival of the rising edge of the pulse 312 on the clock signal 304. The hold time 308 defines a minimum time period after the falling edge of the pulse 312 on the clock signal 304 until a next transition 318 between signaling states on the data signal 302. The I2C Specifications also define a minimum duration 314 for a low period ($t_{LOW}$) for the clock signal 304. The data on the data signal 302 is typically stable and/or can be captured for the duration 310 ($t_{HIGH}$) when the clock signal 304 is in the high logic state after the leading edge of the pulse 312.

The second timing diagram 320 of FIG. 3 illustrates the timing relationship between the data signal 322 and the clock signal 324 while data is being transferred while the serial bus is operated in an DDR mode of communication. The edges 330, 332 in the clock signal 324 may be used to capture data bits 326, 328 transmitted in the data signal 322. For example, a rising edge 330 of a pulse 334 may be used to capture a first data bit 326 ($D_N$) and a falling edge 332 of the pulse 334 may be used to capture a second data bit 328 ($D_{N-1}$). In order to improve reliability of the bit sampling, the transmitter may be configured to transmit high and low periods 336, 338 of the clock signal 324 that have equal duration or nearly equal duration. In DDR modes of communication, two data bits can be transmitted for each clock pulse 334, while in SDR modes of communication, a single data bit is transmitted for each clock pulse 312.

Figure 4:
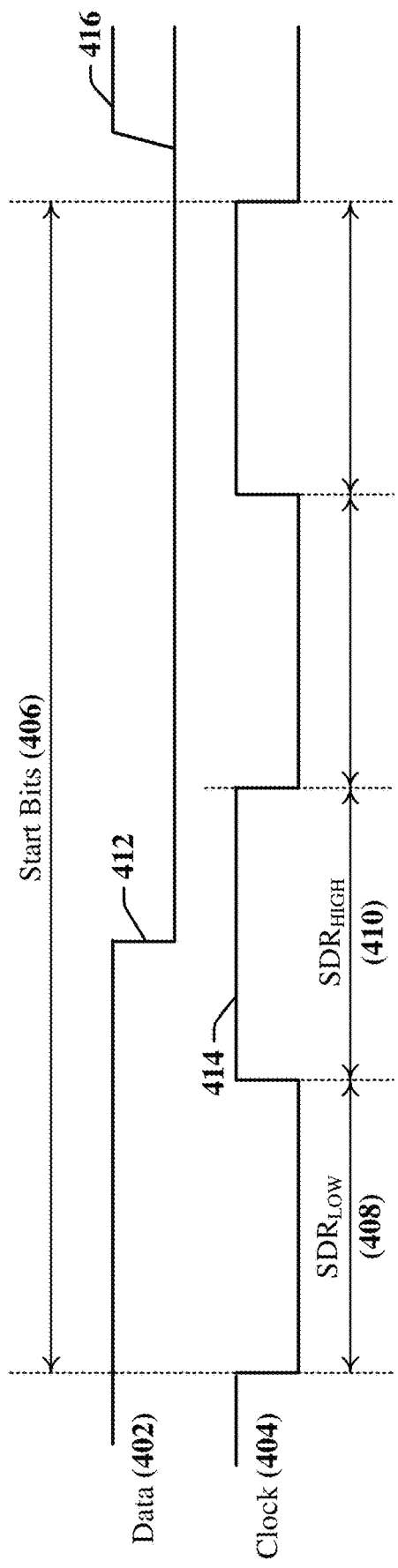
FIG. 4 illustrates timing involving start bits transmitted before each packet of data bits in one example of a serial bus.

FIG. 4 illustrates one example of timing 400 involving start bits 406 transmitted before each packet of data bits in one example of a serial bus. The combination of the start bits 406 and the timing of the clock signal 404 permits the current bus master to signal that data is to be transmitted. In one example, the start bits 406 are configured such that a high-to-low transition 412 in the data signal 402 occurs while the clock signal 404 is in a high state 414. In certain SDR modes of communication, the data signal 402 is required to be stable for the duration of high states 410 when data bits 416 are being transmitted, such that data bit transitions occur during low periods 408. The occurrence of the transition 412 in the data signal 402 during a low period 408 may cause a state machine in a receiver to be reset and wait for data bits 416. Other configurations of start bits 406 may be transmitted to signal beginning of data transmission.

Figure 5:
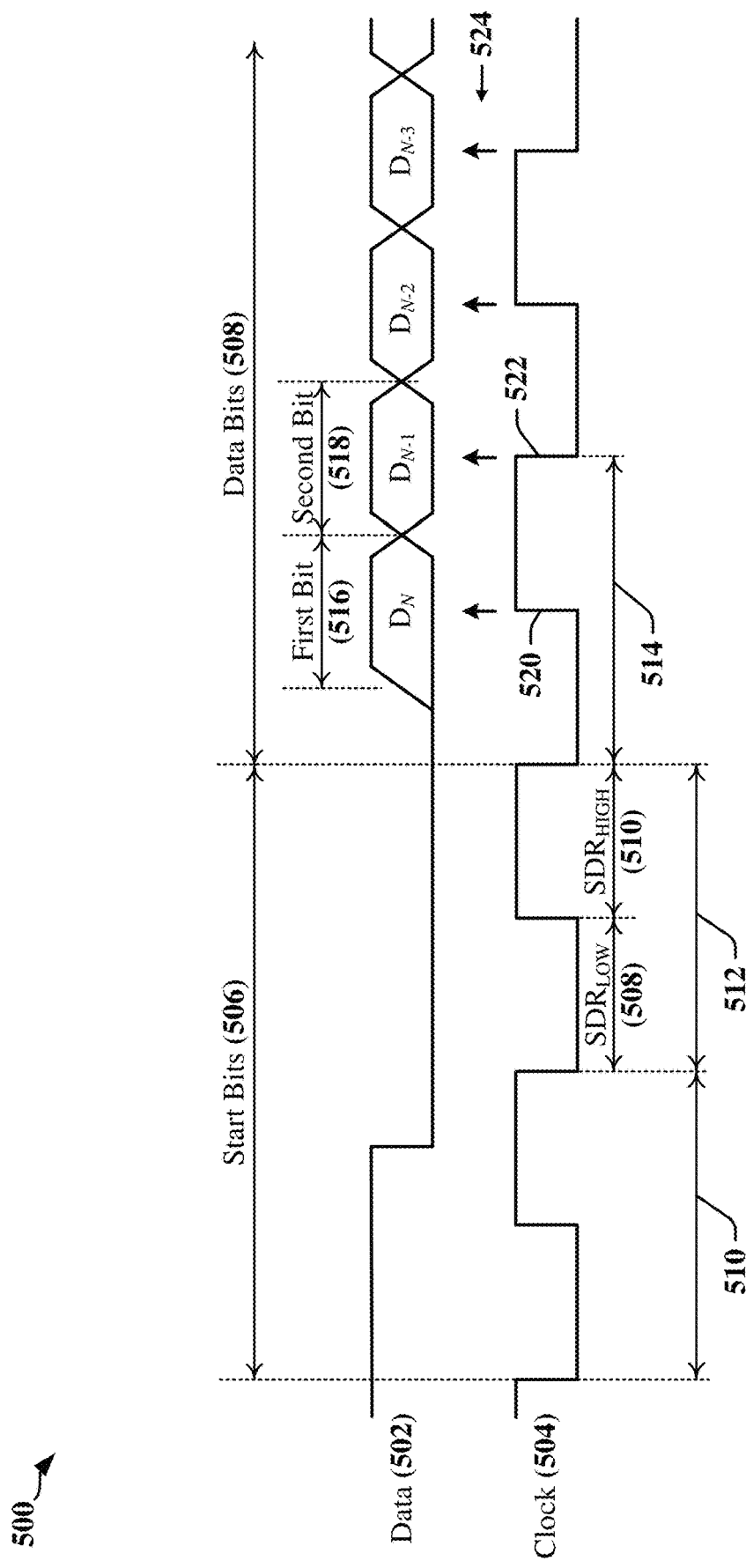
FIG. 5 illustrates timing related to transmission of a packet or frame of data over a serial bus that is operated in DDR modes of communication.

FIG. 5 illustrates timing 500 related to a transmission of a packet or frame of data over a serial bus that is operated in DDR modes of communication. The transmission is initiated when the bus master or transmitting device transmits start bits 506. The start bits 506 are transmitted according to SDR timing, and two periods 510, 512 of the clock signal 504 elapse during transmission of the start bits 506. After the start bits 506 have been transmitted, data bits 508 are transmitted in accordance with DDR timing. Data bits are sampled at times 524 corresponding to transitions in the clock signal 504. For example, a first data bit 516 is captured or sampled at the low-to-high transition 520 in a clock period and a second data bit 518 is captured or sampled at the high-to-low transition 522 in each period 514 of the clock signal 504.

Transmitting Additional Data in DDR Synchronous Communications

Figure 6:
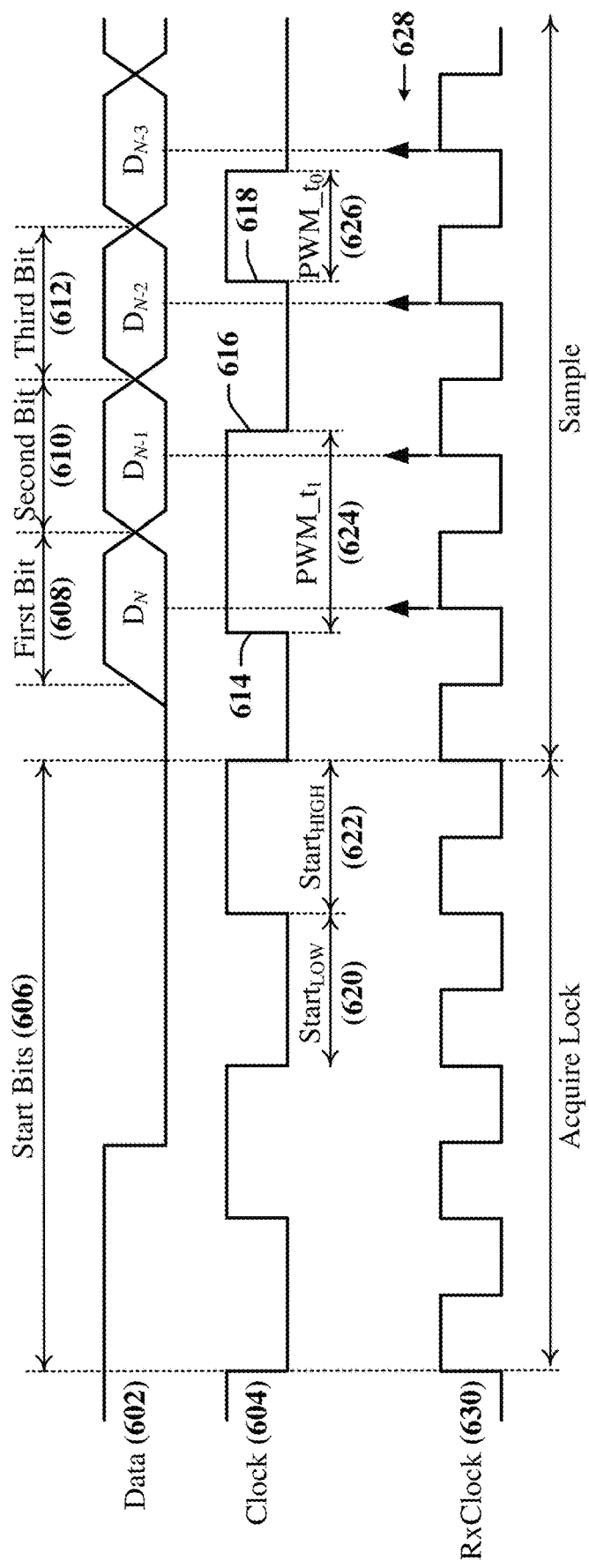
FIG. 6 illustrates timing related to a transmission using a serial interface that has been adapted according to certain aspects disclosed herein.

FIG. 6 illustrates timing related to a transmission 600 using a serial interface that has been adapted according to certain aspects disclosed herein. The serial interface may support transmission of data in a data signal 602 in SDR and DDR modes of communication, and may enable additional information to be transmitted by pulse-width modulating the clock signal 604. The illustrated transmission 600 relates to an example in which the serial bus is operated in a DDR mode of communication. The transmission 600 is initiated when the bus master or transmitting device transmits start bits 606. The transmitter may then transmit data bits 608, 610, 612 according to DDR timing. In one example, a first data bit 608 may be captured at the receiver at a first edge 614 in the clock signal 604, a second data bit 610 may be captured at a second edge 616 in the clock signal 604, and a third data bit 612 may be captured at the receiver at a third edge 618 in the clock signal 604.

Additional data is encoded on the clock signal 604. In the illustrated transmission 600, a 2-level pulse-width modulation (PWM) scheme is employed to encode a bit of additional data in each clock pulse 624, 626 in a transmitted clock signal 604. The transmitter may be configured to provide clock pulses with a 50% duty cycle for transmission with the start bits 606. A 50% duty cycle is achieved when the low period 620 and high period 622 of the transmitted clock signal 604 have equal durations. The receiver may be adapted to produce a receive clock signal 630 (RxClock) that is locked and/or synchronized to the transmitted clock signal 604 during the time that the start bits 606 are being transmitted. The receiver may utilize a 1-cycle synchronizer technique to synchronize its local clock for data latching or sampling. In the illustrated example, the receive clock signal 630 may be an SDR clock that latches data on one type of transition. Here, the latching edges 628 occur at the rising transitions of the receive clock signal 630. In other examples, the receive clock signal 630 may be implemented as a DDR clock that latches data at both rising and falling transitions.

Pulse-width modulation of the clock signal 604 may be performed at clock edge boundaries. In the illustrated example, the width of each clock pulse 624, 626 in the clock signal 604 represents a bit value. In one implementation, a bit value of '1' can be encoded using a pulse 624 of greater duration, while a bit value of '0' can be encoded using a pulse 626 with of lesser duration. In another implementation, a bit value of '0' can be encoded using a pulse 624 of greater duration, while a bit value of '1' can be encoded using a pulse 626 with of lesser duration.

According to certain aspects, the center of each pulse 624, 626 does not shift with respect to time, and the receive clock signal 630. Accordingly, the receive clock signal 630 can maintain synchronism with the transmitted clock signal 604 and data signal 602 when pulse-width modulation is used on the transmitted clock signal 604. The latching edges 628 in the receive clock signal 630 can be expected to align with the data bits 608, 610, 612, enabling reliable data capture using the receive clock signal 630.

According to certain aspects, variations in the width of the pulses 624, 626 in the transmitted clock signal 604 may be limited such that the timing of edges in the clock signal 604 fall within the jitter margins specified for pulses in the transmitted clock signal 604. A sufficiently sensitive receiver may distinguish between the different widths of the pulses 624, 626 in order to decode additional bits of data in the transmitted clock signal 604. In one example, a receiver may use an oversampling clock to measure the widths of the pulses 624, 626. A conventional receiver coupled to the serial bus typically ignores the effects of pulse-width modulation when the variations in the width of the pulses 624, 626 fall within the jitter margins, and/or when the center of each pulse 624, 626 does not shift with respect to time.

In the described 2-level pulse-width modulation example, the combined data rate for the link using clock modulation and DDR on the data line provides an effective tripling of the data rate over SDR modes of operation. Other pulse-width modulation schemes may be used to encode more than 1 bit for each pulse on the transmitted clock signal 604.

Figure 7:
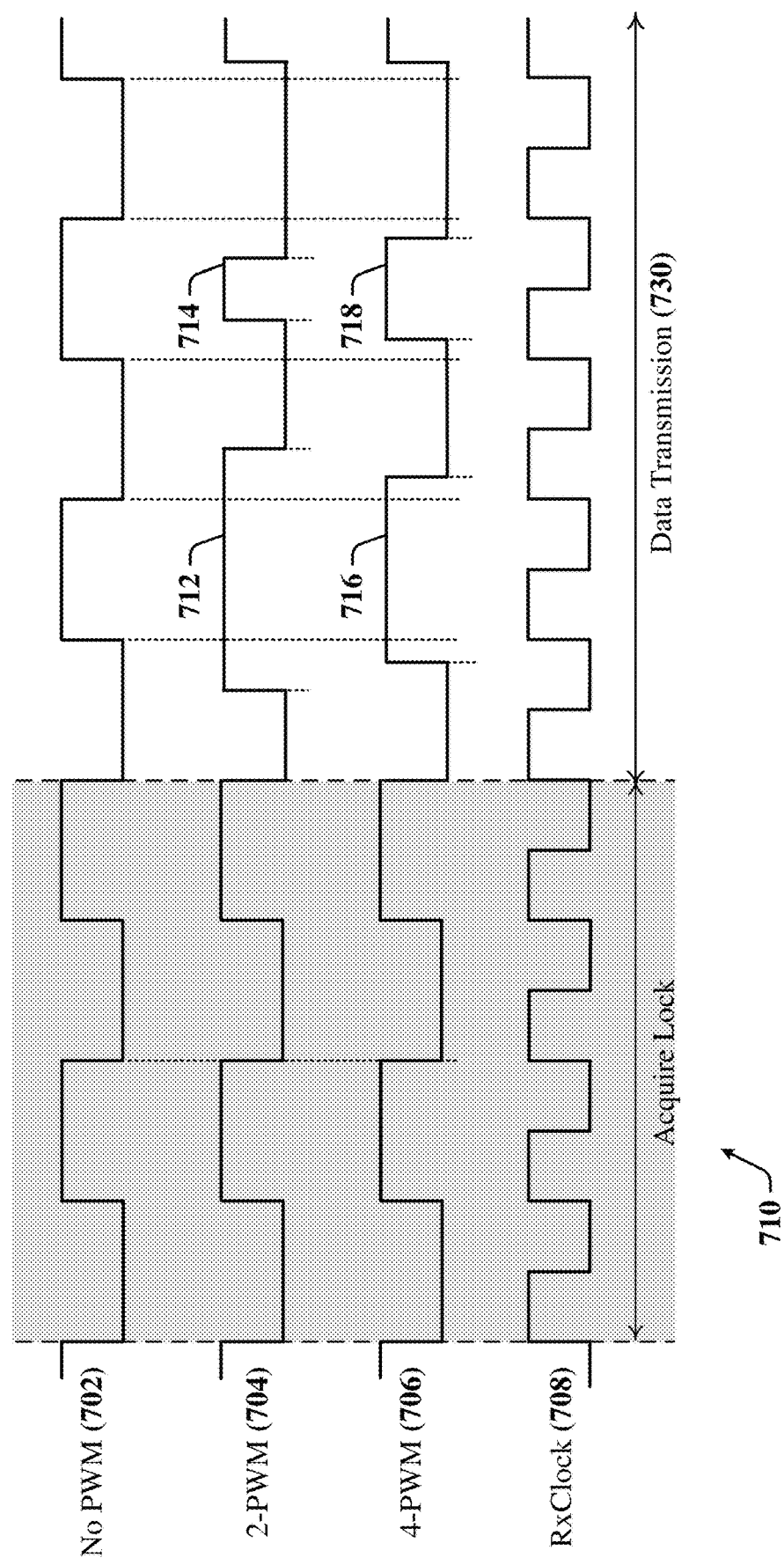
FIG. 7 illustrates certain aspects of timing related to transmissions in which the transmitted clock is pulse-width modulated according to certain aspects disclosed herein.

FIG. 7 illustrates certain aspects of timing 700 related to transmissions in which the transmitted clock is unmodulated, modulated using 2-level pulse-width modulation or modulated using 4-level pulse-width modulation. A transmitter that has been adapted according to certain aspects disclosed herein may be configured to provide clock pulses with a 50% duty cycle for transmission during a clock acquisition period 710 when start bits are transmitted. A receiver may be adapted to generate an internal receive clock 708 to latch DDR data. During the clock acquisition period 710, the internal receive clock 708 may be synchronized (locked) to the transmitted clock signal 702, 704, 706. The receive clock 708 may be used to latch DDR data during a data transmission period 730.

In a first mode of communication, the transmitted clock signal 702 is unmodulated. In a second mode of communication, the transmitted clock signal 704 is modulated using 2-level PWM, where pulses 712, 714 in the transmitted clock signal 704 can have one of 2 durations. A first pulse 712 has a longer duration and a second pulse 714 has a shorter duration, where the durations of the pulses 712, 714 allow the clock signal 704 to satisfy jitter margins specified for pulses in the transmitted clock signal 704. In a third mode of communication, the transmitted clock signal 706 is modulated using 4-level PWM. In the third mode of communication, the transmitted clock signal 706 may include pulses 712 and 714 defined for the second mode of communication and pulses 716 and 718 that have different durations. In one example, the longer pulse 716 has a duration that is less than the duration of the pulse 712, and the shorter pulse 718 has a duration that is greater than the duration of the pulse 714. Variations in the durations of the pulses 712, 714, 716 and 718 in the transmitted clock signal 706 may be selected to enable the clock signal 706 to satisfy jitter margins specified for transmitted pulses.

In one example, an oversampling clock used by the receiver may be configured to have a greater frequency when operating in third mode of communication than the frequency used when operating in second mode of communication. In another example, the level of pulse mode modulation may be selected based on the ability of the receiver to detect differences in pulse width on a transmitted clock signal 702, 704, 706. In some instances, the level of pulse mode modulation may be selected based on variability of the duration of pulses 712, 714, 716 and 718, which may be affected by characteristics of the wire that carries the pulses 712, 714, 716 and 718, and/or by variations in process, voltage and temperature (PVT) within devices associated with the serial bus.

Figure 8:
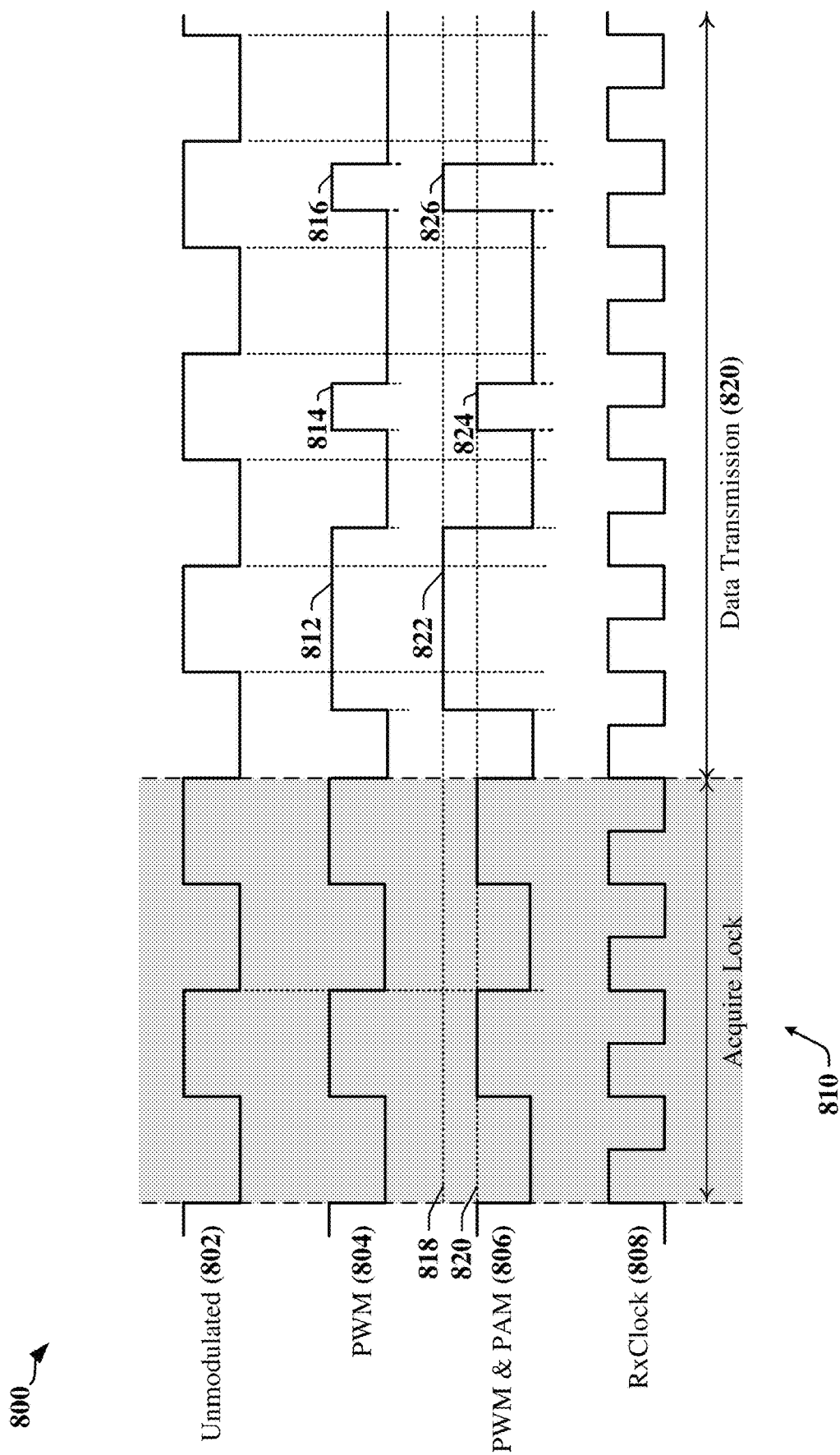
FIG. 8 illustrates certain aspects of timing related to transmissions in which the transmitted clock is pulse-width modulated and pulse-amplitude modulated in accordance with certain aspects disclosed herein.

FIG. 8 illustrates certain aspects of timing 800 related to an example in which the transmitted clock may be modulated using 2-level pulse-width modulation combined with pulse-amplitude modulation (PAM). A transmitter that has been adapted according to certain aspects disclosed herein may be configured to provide clock pulses with a 50% duty cycle for transmission during a clock acquisition period 810 when start bits are transmitted. A receiver may be adapted to generate an internal receive clock 808 to latch DDR data. During the clock acquisition period 810, the internal receive clock 808 may be synchronized (locked) to the transmitted clock signal 802, 804, 806. The receive clock 808 may be used to latch DDR data during a data transmission period 830.

In a first mode of communication, the transmitted clock signal 802 is unmodulated. In a second mode of communication, the transmitted clock signal 804 is modulated using 2-level PWM, where pulses 812, 814 in the transmitted clock signal 804 can have one of 2 durations. A first pulse 812 has a longer duration and a second pulse 814 has a shorter duration, where the durations of the pulses 812, 814 allow the clock signal 804 to satisfy jitter margins specified for pulses in the transmitted clock signal 804.

In a third mode of communication, the transmitted clock signal 806 may be pulse-amplitude modulated. When PAM is used, pulses 822, 824, 826 may be transmitted in the clock signals in one of a plurality of defined voltage levels. FIG. 8 illustrates single-polarity PAM where the pulse 822, 824, 826 in the clock signals switch between a base voltage (0 Volts) and one of two voltage levels 818, 820 selected based on the value of a bit of data to be encoded in the current pulse 822, 824, 826. In one example, higher voltage pulses 822, 826 may encode a bit value of 1, and lower voltage pulses 824 may encode a bit value of 0. The number of bits encoded using PAM may be determined by design and/or by the ability of transmitters and receivers to distinguish between available signaling voltages.

In the illustrated example, two bits of data may be encoded when the third mode of communication is enabled. A first bit is encoded in the width of the pulses 822, 824, 826, and a second bit is encoded in the voltage level of the pulses 822, 824, 826. In some interfaces, PAM may be used to encode data in data signals and in clock signals. Some interfaces may be operated in accordance with protocols that employ PWM and/or PAM for data signaling and the additional information may be transmitted in a clock signal.

Example of Apparatus Adapted for Transmitting Additional Data

Figure 9:
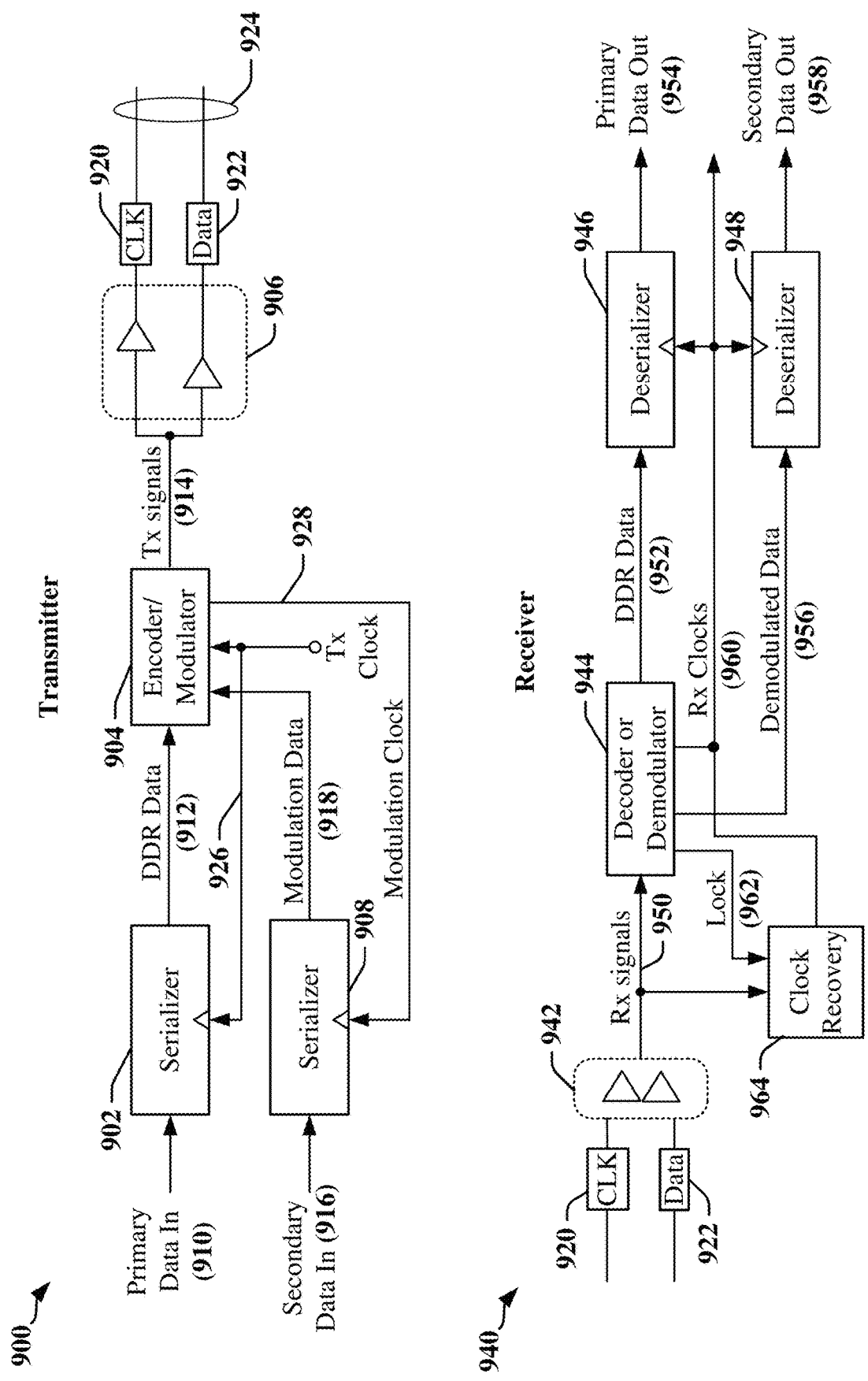
FIG. 9 illustrates an example of a transmitter and a receiver coupled to a serial bus and configured or adapted according to certain aspects disclosed herein.

FIG. 9 illustrates an example of a transmitter 900 and a receiver 940 coupled to a serial bus 924 and configured or adapted according to certain aspects disclosed herein. The transmitter 900 and/or receiver 940 may be adapted or configured to enable data (Primary Data 910) to be transmitted and/or received according to a DDR mode of communication. The transmitter 900 and/or receiver 940 may be further adapted or configured to enable additional data (Secondary Data 916) to be transmitted and/or received in pulse-width modulated pulses in a clock signal 920 transmitted over the wires of the serial bus 924. For the purposes of this description, the data encoded and transmitted in the data signal 922 may be referred to as Primary Data 910. For the purposes of this description, data encoded and transmitted in a pulse-width modulated clock signal 920 may be referred to as Secondary Data 916.

The transmitter 900 may generate the data signal 922 using a primary serializer 902 that serializes the Primary Data 910 for transmission on the data signal 922 in accordance with the timing of the clock provided on the clock signal 920. The primary serializer 902 is typically clocked by the transmit clock signal 926 to produce DDR data 912 for transmission on the data signal 922.

The transmitter 900 may also be configured or adapted to encode the Secondary Data 916 using pulse-width modulation. In some examples, the Secondary Data 916 may be serialized by a secondary serializer 908 in order to generate a stream of bits (modulation data 918) that can be encoded by an encoder/modulator 904 in the width of pulses transmitted in the clock signal 920. The secondary serializer 908 may be clocked by the transmit clock signal 926 and/or a modulation clock 928 which may be a gated version of the transmit clock signal 926.

The encoder/modulator 904 may include circuits and modules that can be enabled or disabled based on current mode of communication of the serial bus 924. These circuits may include gates, delays and combinational logic to extend a clock pulse when PWM is used, for example. The encoder/modulator 904 outputs transmission signals 914 that are based on the DDR data 912 and the transmit clock signal 926. The transmission signals 914 may be relayed versions of the DDR data 912 and a modulated or unmodulated transmit clock signal 926. In some instances, modulation circuits of the encoder/modulator 904 may be configured to control the operation of line driving circuits, such as the drivers 906. For example, the modulation circuits of the may control the voltage levels of signals output by the line driving circuits when PAM is used. The line driving circuits may be implemented using open-drain drivers, push-pull drivers or some other configuration of analog and digital circuits appropriate for the modulation scheme or schemes adopted.

A receiver 940 may include a set of line receivers 942, which may include differential receivers, single-ended receivers, and/or receivers that can detect voltage levels. The line receivers 942 may be adapted or configured to provide multiple receive signals 950 to a decoder/demodulator 944. The decoder/demodulator 944 may be configured to extract DDR data 952 from the data signals 922 and to provide clock information 962 derived from the clock signal 920 and/or data signal 922 to a clock recovery circuit 964 that produces one or more receive clocks 960. For example, the clock information 962 may include a lock signal that indicates when start bits are being transmitted. The clock recovery circuit 964 may produce one or more receive clocks 960, including a receive clock 960 used to latch DDR encoded data. Deserialization may be performed by a primary deserializer 946 to provide output Primary Data 954 and a secondary deserializer 948 to provide output Secondary Data 958.

The decoder/demodulator 944 may determine that the clock signal 920 is pulse-width modulated. The decoder/demodulator 944 may be configured to decode the Secondary Data 958 from a pulse-width modulated clock signal 920. The decoder/demodulator 944 may include circuits for detecting timing differences in the clock signal 920. Timing differences may be detected and measured using counters, timers, one-shot delays, etc.

The decoder/demodulator 944 may determine that the clock signal 920 is pulse-amplitude modulated. The line receivers 942 may provide certain of the receive signals 950 that indicate voltage levels of signals received from the serial bus 924. The decoder/demodulator 944 may be configured to decode the Secondary Data 958 from a combination of pulse-width modulation and pulse-amplitude modulation of the clock signal 920. The decoder/demodulator 944 may include circuits for detecting timing differences in the clock signal 920. Timing differences may be detected and measured using counters, timers, one-shot delays, etc. The decoder/demodulator 944 and/or line receivers 942 may include circuits for detecting voltage differences in the clock signal 920. Voltage differences may be detected and measured using voltage comparators, for example.

Certain aspects have been described with reference to an interface operated in accordance with an I3C protocol. Various aspects are applicable to interfaces that are operated according to other protocols. In some examples, a UART-based interface may be adapted in accordance with certain aspects disclosed herein. In other examples, additional data may be encoded in clock signals or other signals transmitted in accordance with a protocol associated with a VGI interface.

Examples of Processing Circuits and Methods

Figure 10:
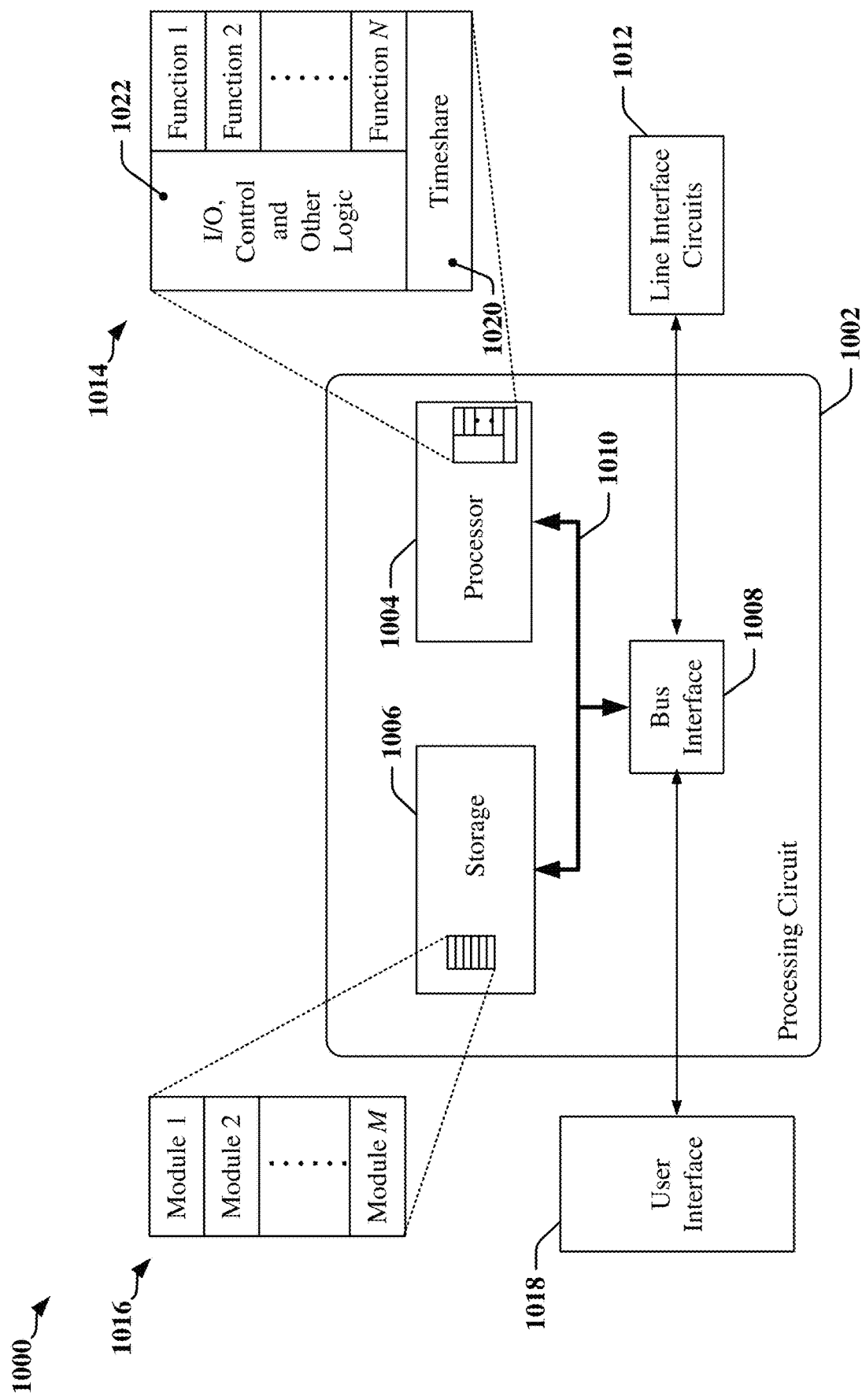
FIG. 10 is a block diagram illustrating an example of an apparatus employing a processing circuit that may be adapted according to certain aspects disclosed herein.

FIG. 10 is a diagram illustrating an example of a hardware implementation for an apparatus 1000 employing a processing circuit 1002 that may be configured to perform one or more functions disclosed herein. In accordance with various aspects of the disclosure, an element, or any portion of an element, or any combination of elements as disclosed herein may be implemented using the processing circuit 1002. The processing circuit 1002 may include one or more processors 1004 that are controlled by some combination of hardware and software modules. Examples of processors 1004 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012. A transceiver 1012 may be provided for each networking technology supported by the processing circuit. In some instances, multiple networking technologies may share some or all of the circuitry or processing modules found in a transceiver 1012. Each transceiver 1012 provides a means for communicating with various other apparatus over a transmission medium. Depending upon the nature of the apparatus 1000, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement any one of the methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer-readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as the transceiver 1012, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to the transceiver 1012, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Figure 11:
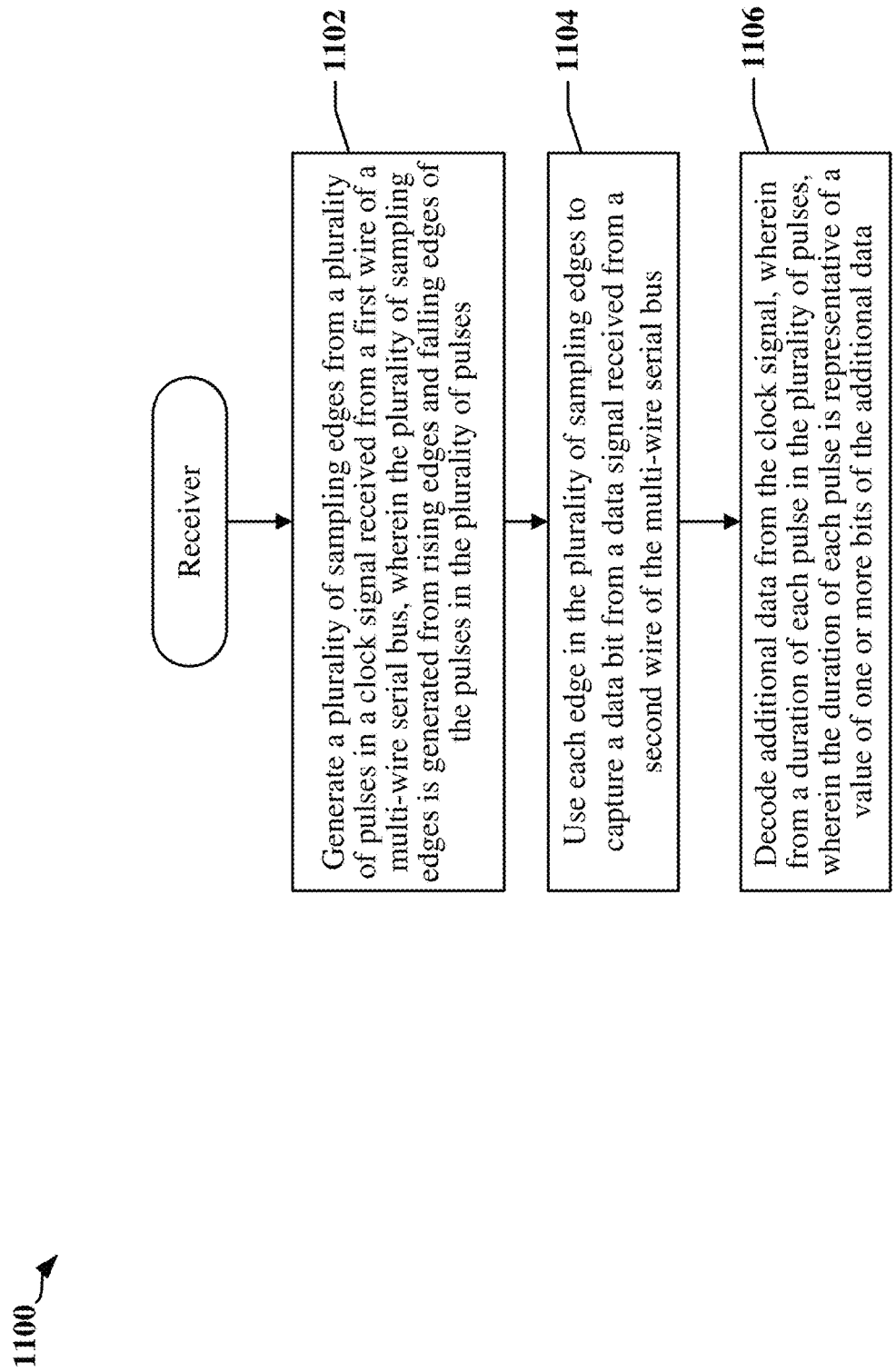
FIG. 11 is a flowchart illustrating certain aspects of a device configured to transmit data in a pulse-width modulated clock signal in accordance with certain aspects disclosed herein.

FIG. 11 is a flowchart 1100 of a method that may be performed at a receiving device coupled to a serial bus.

At block 1102, the receiving device may generate a plurality of sampling edges from a plurality of pulses in a clock signal received from a first wire of a multi-wire serial bus. The plurality of sampling edges may be generated from rising edges and falling edges of the pulses in the plurality of pulses.

At block 1104, the receiving device may use each edge in the plurality of sampling edges to capture a data bit from a data signal received from a second wire of the multi-wire serial bus.

At block 1106, the receiving device may decode additional data from the clock signal, where a duration of each pulse in the plurality of pulses is representative of a value of one or more bits of the additional data. In one example, the duration of each pulse in the plurality of pulses is representative of a value of one bit of the additional data. In another example, the duration of each pulse in the plurality of pulses is representative of a value of two bits of the second data.

In some examples, the receiving device may generate a receive clock synchronized with the clock signal and the data signal, and capture data bits from the data signal using the receive clock. Capturing the data bits from the data signal may include capturing one data bit per cycle of the receive clock. Capturing the data bits from the data signal may include capturing two data bits per cycle of the receive clock. The receiving device may receive start bits from the data signal before capturing data bits from the data signal, and may synchronize the receive clock using one or more pulses received in the clock signal while receiving the start bits. Each of the one or more pulses may have a duration that is approximately half the period of the clock signal.

In some instances, a center of each pulse in the clock signal is aligned with a transition between successive bits in the data signal.

In one example, the additional data is decoded from the clock signal while the serial bus is operated in accordance with an I3C protocol.

Figure 12:
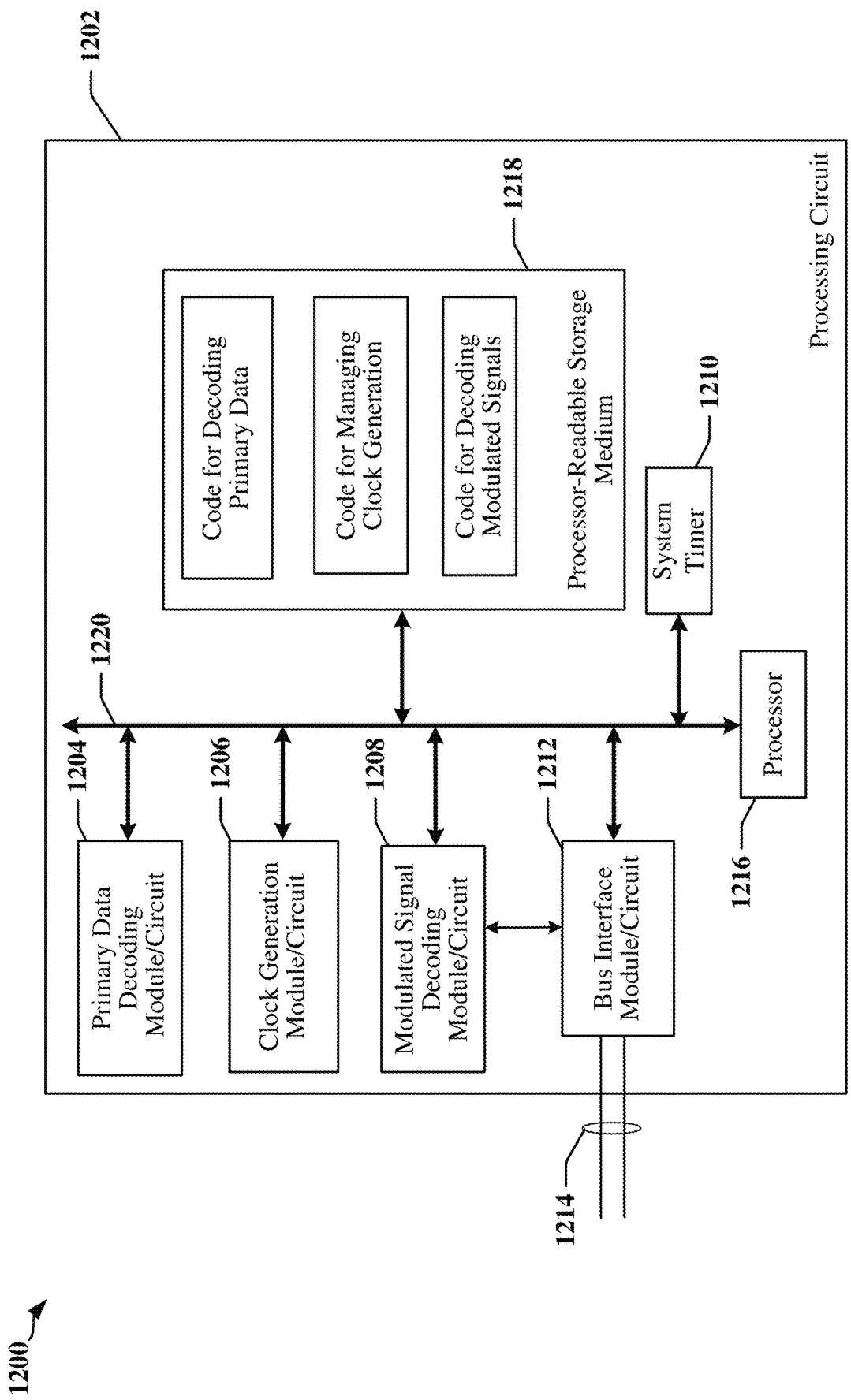
FIG. 12 is a diagram illustrating an example of a hardware implementation for a transmitting apparatus that encodes data in a pulse-width modulated clock signal in accordance with certain aspects disclosed herein.

FIG. 12 is a diagram illustrating a simplified example of a hardware implementation for an apparatus 1200 employing a processing circuit 1202. The processing circuit typically has a processor 1216 that may include one or more of a microprocessor, microcontroller, digital signal processor, a sequencer and a state machine. The processing circuit 1202 may be implemented with a bus architecture, represented generally by the bus 1220. The bus 1220 may include any number of interconnecting buses and bridges depending on the specific application of the processing circuit 1202 and the overall design constraints. The bus 1220 links together various circuits including one or more processors and/or hardware modules, represented by the processor 1216, the modules or circuits 1204, 1206 and 1208, line interface circuits 1212 configurable to communicate over a multi-wire serial bus 1214 that includes a plurality of connectors or wires, and the computer-readable storage medium 1218. The bus 1220 may also link various other circuits such as timing sources, peripherals, voltage regulators, and power management circuits, which are well known in the art, and therefore, will not be described any further.

The processor 1216 is responsible for general processing, including the execution of software stored on the computer-readable storage medium 1218. The software, when executed by the processor 1216, causes the processing circuit 1202 to perform the various functions described supra for any particular apparatus. The computer-readable storage medium 1218 may also be used for storing data that is manipulated by the processor 1216 when executing software, including data decoded from symbols transmitted over the multi-wire serial bus 1214. The processing circuit 1202 further includes at least one of the modules 1204, 1206 and 1208. The modules 1204, 1206 and 1208 may be software modules running in the processor 1216, resident/stored in the computer-readable storage medium 1218, one or more hardware modules coupled to the processor 1216, or some combination thereof. The modules 1204, 1206 and 1208 may include microcontroller instructions, state machine configuration parameters, or some combination thereof.

In one configuration, the apparatus 1200 includes a module and/or circuit 1206 that is configured to generate a plurality of sampling edges from a plurality of pulses in a clock signal received from a first wire of the multi-wire serial bus 1214, where the plurality of sampling edges may be generated from rising edges and falling edges of the pulses in the plurality of pulses. The apparatus 1200 includes a module and/or circuit 1204 that is configured to capture and decode data bits from a data signal received from a second wire of the multi-wire serial bus 1214 using each edge in the plurality of sampling edges. The apparatus 1200 includes a module and/or circuit 1208 that is configured to decode additional data from the clock signal, where the additional data is encoded in modulation of the clock signal. In one example, the duration of each pulse in the plurality of pulses is representative of a value of one bit of the additional data. In another example, the duration of each pulse in the plurality of pulses is representative of a value of two bits of the second data.

In one example, the line interface circuits 1212 include a plurality of receivers where each receiver is coupled to a wire of the multi-wire serial bus 1214. The clock generating module and/or circuit 1206 may include clock generation circuits configured to provide sampling edges in a receive clock signal. The sampling edges may correspond to both rising edges of pulses and falling edges of the pulses in a clock signal received from a first wire of the multi-wire serial bus 1214. The decoding module and/or circuit 1204 may include a decoder configured to capture first data from a data signal received from a second wire of the multi-wire serial bus 1214 using the sampling edges. The decoder may be configured to capture one or more bits of the first data per cycle of the receive clock. The demodulating module and/or circuit 1208 may include a pulse-width demodulator configured to extract second data encoded in durations of the pulses in the clock signal. Each pulse may have a duration representative of a value of one or more bits of the second data.

In some instances, the duration of each pulse in the plurality of pulses is representative of a value of one bit of the second data. The duration of each pulse in the plurality of pulses may be representative of a value of two bits or more of the second data.

The clock generation circuits may be adapted or configured to synchronize the receive clock using one or more pulses received in the clock signal while receiving start bits from the data signal before bits of the first data are available for capture from the data signal. Each of the one or more pulses has a duration that is approximately half the period of the clock signal. That is, the one or more pulses have approximately a 50% duty cycle. After synchronization has been locked, a center of each pulse in the clock signal is aligned with a transition between successive bits transmitted in the data signal.

In some examples, the module and/or circuit 1208 may include a pulse-amplitude demodulator configured to decode third data from the clock signal, when bits of the third data are encoded in voltage levels of the plurality of pulses.

Figure 13:
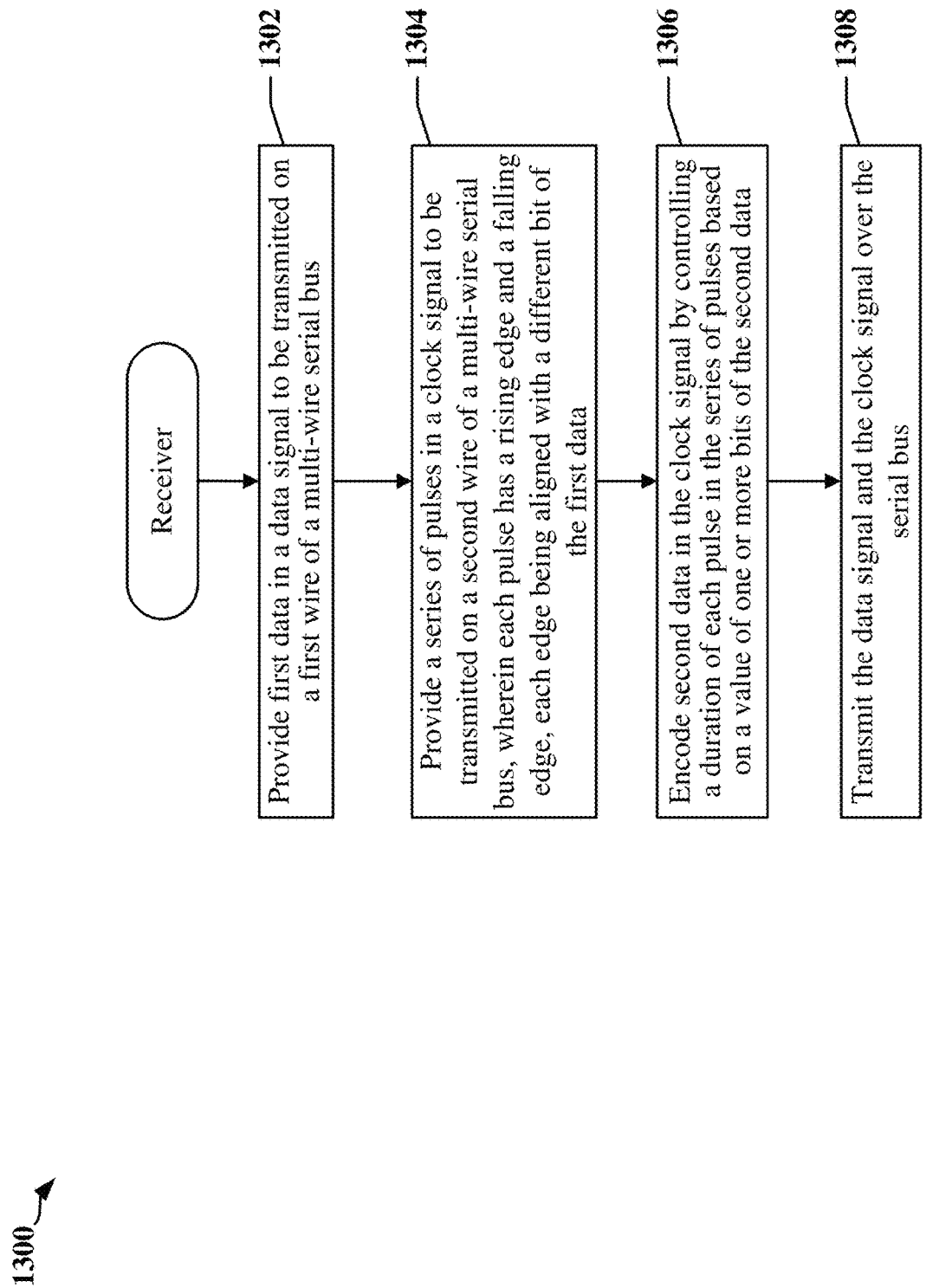
FIG. 13 is a flowchart illustrating certain aspects of a device configured to decode data from a pulse-width modulated clock signal in accordance with certain aspects disclosed herein.

FIG. 13 is a flowchart illustrating certain aspects of a transmitting device coupled to a serial bus.

At block 1302, the transmitting device may provide first data in a data signal to be transmitted on a first wire of a multi-wire serial bus.

At block 1304, the transmitting device may provide a series of pulses in a clock signal to be transmitted on a second wire of a multi-wire serial bus. Each pulse has a rising edge and a falling edge, and each edge is aligned with a different bit of the first data.

At block 1306, the transmitting device may encode second data in the clock signal by controlling a duration of each pulse in the series of pulses based on a value of one or more bits of the second data. In one example, one bit of the second data is used to select between two possible pulse durations for each pulse. In another example, two bits of the second data are used to select between four possible pulse durations for each pulse.

At block 1308, the transmitting device may transmit the data signal and the clock signal over the serial bus. In one example, the data may be transmitted while the serial bus is operated in accordance with an I3C protocol.

In one example, the transmitting device may provide start bits in the data signal, where the start bits precede the first data in transmission. The transmitting device may clock the start bits using two pulses in the clock signal, where each of the two pulses has a duration that is approximately half the period of the clock signal.

According to certain aspects, a center of each pulse in the clock signal is aligned with a transition between successive bits in the data signal.

In one example, the duration of each pulse may be controlled by selecting the duration of each pulse from a plurality of possible durations based on the value of the one or more bits of the second data. For each of the plurality of possible durations, the timing of edges of each pulse may remain within tolerances defined for clock jitter on the serial bus.

Figure 14:
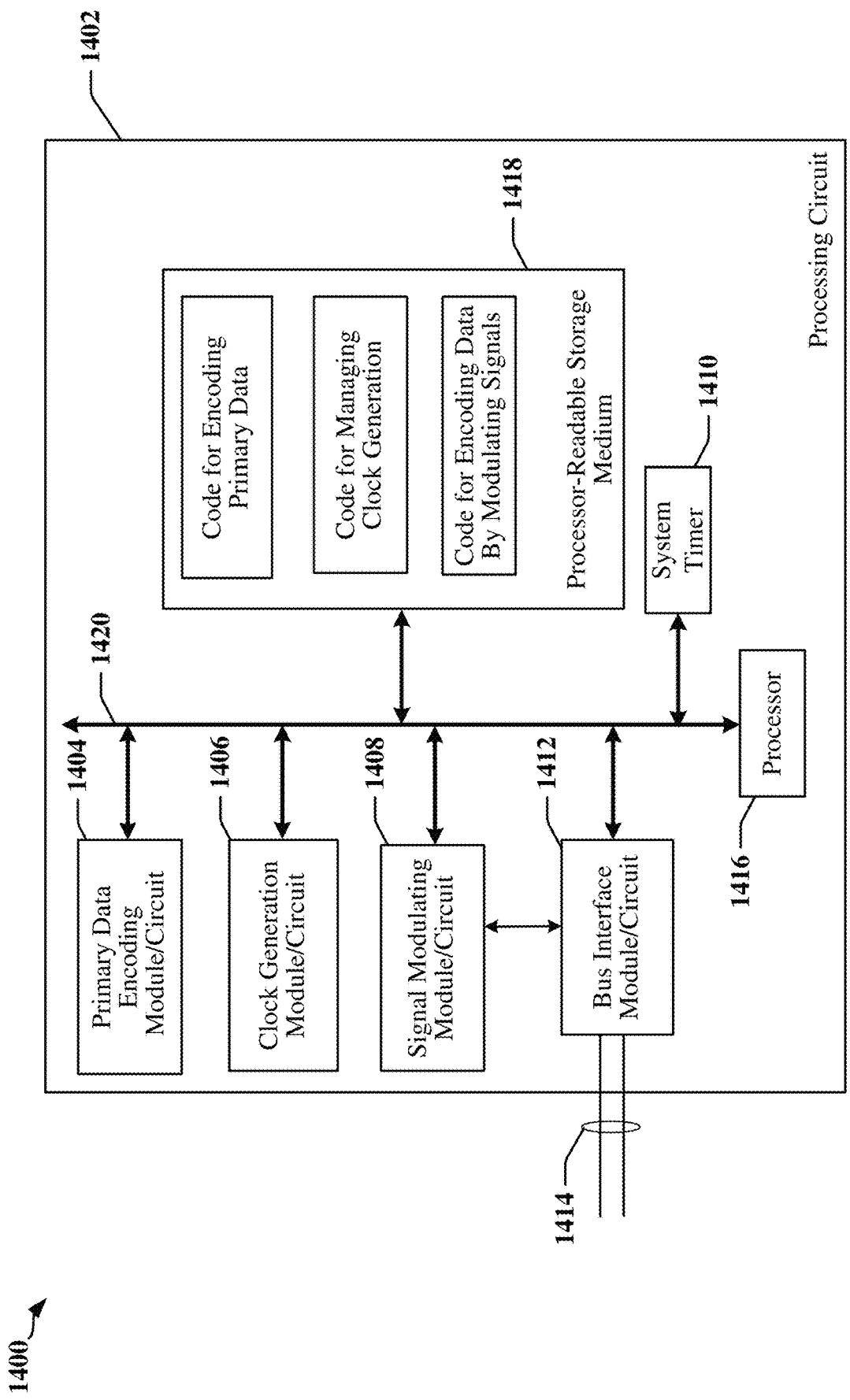
FIG. 14 is a diagram illustrating an example of a hardware implementation for a receiving apparatus that decodes data from a pulse-width modulated clock signal in accordance with certain aspects disclosed herein.

FIG. 14 is a diagram illustrating a simplified example of a hardware implementation for an apparatus 1400 employing a processing circuit 1402. The processing circuit typically has a processor 1416 that may include one or more of a microprocessor, microcontroller, digital signal processor, a sequencer and a state machine. The processing circuit 1402 may be implemented with a bus architecture, represented generally by the bus 1420. The bus 1420 may include any number of interconnecting buses and bridges depending on the specific application of the processing circuit 1402 and the overall design constraints. The bus 1420 links together various circuits including one or more processors and/or hardware modules, represented by the processor 1416, the modules or circuits 1404, 1406 and 1408, line interface circuits 1412 configurable to communicate over a multi-wire serial bus 1414 that includes a plurality of connectors or wires, and the computer-readable storage medium 1418. The bus 1420 may also link various other circuits such as timing sources, peripherals, voltage regulators, and power management circuits, which are well known in the art, and therefore, will not be described any further.

The processor 1416 is responsible for general processing, including the execution of software stored on the computer-readable storage medium 1418. The software, when executed by the processor 1416, causes the processing circuit 1402 to perform the various functions described supra for any particular apparatus. The computer-readable storage medium 1418 may also be used for storing data that is manipulated by the processor 1416 when executing software, including data decoded from symbols transmitted over the multi-wire serial bus 1414. The processing circuit 1402 further includes at least one of the modules 1404, 1406 and 1408. The modules 1404, 1406 and 1408 may be software modules running in the processor 1416, resident/stored in the computer-readable storage medium 1418, one or more hardware modules coupled to the processor 1416, or some combination thereof. The modules 1404, 1406 and 1408 may include microcontroller instructions, state machine configuration parameters, or some combination thereof.

In one configuration, the apparatus 1400 includes a module and/or circuit 1404 that is configured to provide first data in a data signal to be transmitted on a first wire of a multi-wire serial bus. The apparatus 1400 may include a module and/or circuit 1406 that is configured to provide a series of pulses in a clock signal to be transmitted on a second wire of a multi-wire serial bus. Each pulse may have a rising edge and a falling edge, and each edge is aligned with a different bit of the first data. The apparatus 1400 may include modules and/or circuits 1406, 1408 that are configured to encode second data in the clock signal by modulating one or more signals transmitted over the multi-wire serial bus 1414. In one example, one bit of the second data is used to select between two possible pulse durations for each pulse. In another example, two bits of the second data are used to select between four possible pulse durations for each pulse. The apparatus 1400 may include a module and/or circuit 1412 that is configured to transmit the data signal and the clock signal over the multi-wire serial bus 1414. In one example, the data may be transmitted while the serial bus is operated in accordance with an I3C protocol.

In one example, the line interface circuits 1412 include a plurality of line drivers, where each line driver is coupled to a wire of the multi-wire serial bus 1414. An encoding module and/or circuit 1404 may include an encoder configured to encode first data in a data signal to be transmitted through a first line driver. The clock generation module and/or circuit 1406 may include a clock generator configured to provide a series of pulses in a clock signal to be transmitted through a second line driver. Each pulse has a rising edge and a falling edge, and each edge may be aligned with a different bit of the first data. The clock generator may be adapted or configured to provide two pulses in the clock signal, where each pulse has a duration that is approximately half the period of the clock signal. The signal modulating module and/or circuit 1408 may include a pulse-width modulator adapted to encode second data in the clock signal by controlling a duration of each pulse in the series of pulses based on a value of one or more bits of the second data. The signal modulating module and/or circuit 1408 may include a pulse-amplitude modulator adapted to encode third data in the clock signal by controlling a voltage level of each pulse in the series of pulses based on a value of one or more bits of the third data.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method performed at a receiving device coupled to a multi-wire serial bus, comprising:
   generating a plurality of sampling edges from a plurality of pulses in a clock signal that is received from a transmitting device over a first wire of the multi-wire serial bus, wherein each pulse in the plurality of pulses includes a rising edge and a falling edge that are used to generate corresponding sampling edges included in the plurality of sampling edges;
   using each edge in the plurality of sampling edges to capture a data bit from a double data rate (DDR) encoded data signal that is received from the transmitting device over a second wire of the multi-wire serial bus; and
   decoding at least one bit of additional data encoded by the transmitting device in each pulse in the plurality of pulses, wherein the additional data is encoded by the transmitting device in durations of pulses in the plurality of pulses.

2. The method of claim 1, wherein the duration of each pulse in the plurality of pulses is representative of a value of one bit of the additional data.

3. The method of claim 1, wherein the duration of each pulse in the plurality of pulses is representative of a value of two bits of the additional data.

4. The method of claim 1, further comprising:
   generating a receive clock synchronized with the clock signal and the data signal; and
   capturing data bits from the data signal using the receive clock.

5. The method of claim 4, wherein capturing the data bits from the data signal comprises:
   capturing one data bit per cycle of the receive clock.

6. The method of claim 4, wherein capturing the data bits from the data signal comprises:
   capturing two data bits per cycle of the receive clock.

7. The method of claim 4, further comprising:
   receiving start bits from the data signal before capturing the data bits from the data signal; and synchronizing the receive clock using one or more pulses received in the clock signal while receiving the start bits, wherein each of the one or more pulses has a duration that is approximately half a period of the clock signal.

8. The method of claim 1, wherein a center of each pulse in the clock signal is aligned with a transition between successive bits in the data signal.

9. The method of claim 1, wherein the additional data is decoded from the clock signal while the multi-wire serial bus is operated in accordance with an I3C protocol.

10. The method of claim 1, further comprising:
decoding pulse-amplitude modulated data from the clock signal, wherein the pulse-amplitude modulated data is encoded in voltage levels of the plurality of pulses.

11. An apparatus, comprising:
a plurality of receivers, each receiver being coupled to a wire of a serial bus;
a clock generator configured to provide sampling edges in a receive clock signal, wherein the sampling edges correspond to edges of pulses in a clock signal received from a first wire of the serial bus, wherein each pulse includes a rising edge and a falling edge;
a decoder configured to capture first data from a double data rate (DDR) encoded data signal received from a transmitting device over a second wire of the serial bus using the sampling edges; and
a pulse-width demodulator configured to extract at least one bit of second data from encoded by the transmitting device in each pulse in the clock signal, wherein the second data is encoded by the transmitting device in durations of the pulses in the clock signal.

12. The apparatus of claim 11, wherein the duration of each pulse in the pulses is representative of a value of one bit of the second data.

13. The apparatus of claim 11, wherein the duration of each pulse in the pulses is representative of a value of two bits of the second data.

14. The apparatus of claim 11, wherein the decoder is configured to:
capture one bit of the first data per cycle of the receive clock signal.

15. The apparatus of claim 11, wherein the decoder is configured to:
capture two bits of the first data per cycle of the receive clock signal.

16. The apparatus of claim 11, wherein the clock generator is configured to:
synchronize the receive clock signal using one or more pulses received in the clock signal while receiving start bits from the data signal before bits of the first data are available for capture from the data signal, wherein each of the one or more pulses has a duration that is approximately half a period of the clock signal.

17. The apparatus of claim 11, wherein a center of each pulse in the clock signal is aligned with a transition between successive bits transmitted in the data signal.

18. The apparatus of claim 11, wherein the second data is decoded from the clock signal while the serial bus is operated in accordance with an I3C protocol.

19. The apparatus of claim 11, further comprising:
a pulse-amplitude demodulator configured to decode third data from the clock signal, wherein bits of the third data are encoded in voltage levels of the pulses.

20. A method performed at a transmitting device coupled to a multi-wire serial bus, comprising:

providing first data in a data signal to be transmitted on a first wire of the multi-wire serial bus;
providing a series of pulses in a clock signal to be transmitted on a second wire of the multi-wire serial bus, wherein the first data is transmitted in accordance with double data rate (DDR) timing by transmitting bits of the first data on both rising edges and falling edges of the clock signal;
encoding second data in the clock signal by controlling a duration of each pulse in the series of pulses based on a value of one or more bits of the second data; and
transmitting the data signal and the clock signal over the multi-wire serial bus.

21. The method of claim 20, wherein one bit of the second data is used to select between two possible pulse durations for each pulse.

22. The method of claim 20, wherein two bits of the second data are used to select among four possible pulse durations for each pulse.

23. The method of claim 20, further comprising:
providing start bits in the data signal, wherein the start bits precede the first data in transmission; and
clocking the start bits using two pulses in the clock signal, wherein each of the two pulses has a duration that is approximately half a period of the clock signal.

24. The method of claim 20, wherein a center of each pulse in the clock signal is aligned with a transition between successive bits in the data signal.

25. The method of claim 20, wherein controlling the duration of each pulse comprises:
selecting the duration of each pulse from a plurality of possible durations based on the value of the one or more bits of the second data, wherein for each of the plurality of possible durations, timing of edges of each pulse remains within tolerances defined for clock jitter on the multi-wire serial bus.

26. The method of claim 20, wherein the second data is transmitted while the multi-wire serial bus is operated in accordance with an I3C protocol.

27. The method of claim 20, further comprising:
encoding third data in the clock signal by controlling a voltage level of each pulse in the series of pulses based on a value of one or more bits of the third data.

28. An apparatus, comprising:
a plurality of line drivers, each line driver being coupled to a wire of a serial bus;
an encoder configured to encode first data in a data signal to be transmitted through a first line driver;
a clock generator configured to provide a series of pulses in a clock signal to be transmitted through a second line driver, wherein the first data is transmitted in accordance with double data rate (DDR) timing by transmitting bits of the first data on both rising edges and falling edges of the clock signal; and
a pulse-width modulator configured to encode second data in the clock signal by controlling a duration of each pulse in the series of pulses based on a value of one or more bits of the second data.

29. The apparatus of claim 28, wherein the clock generator is configured to:
provide two pulses in the clock signal, each of the two pulses having a duration that is approximately half a period of the clock signal.

30. The apparatus of claim 28, further comprising:
a pulse-amplitude modulator configured to encode third data in the clock signal by controlling a voltage level of each pulse in the series of pulses based on a value of one or more bits of the third data.

\* \* \* \* \*